United States Patent
Rekstad, Jr.

(10) Patent No.: US 11,979,631 B2
(45) Date of Patent: May 7, 2024

(54) AUDIO VIDEO SYNCHRONIZATION

(71) Applicant: Comcast Cable Communications, LLC, Philadelphia, PA (US)

(72) Inventor: Gary Michael Rekstad, Jr., Langhorne, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/016,044

(22) Filed: Sep. 9, 2020

(65) Prior Publication Data

US 2021/0051360 A1 Feb. 18, 2021

Related U.S. Application Data

(63) Continuation of application No. 16/035,528, filed on Jul. 13, 2018, now Pat. No. 10,805,663.

(51) Int. Cl.
*H04N 21/43* (2011.01)
*H04N 7/01* (2006.01)
*H04N 21/235* (2011.01)

(52) U.S. Cl.
CPC ....... *H04N 21/43072* (2020.08); *H04N 7/014* (2013.01); *H04N 21/235* (2013.01)

(58) Field of Classification Search
CPC ... H04N 21/4307; H04N 21/235; H04N 7/014
USPC ......... 348/515, 500; 725/112, 114, 136; 709/217; 375/240.02; 386/201, 207
See application file for complete search history.

(56) References Cited

U.S. PATENT DOCUMENTS

| | | | |
|---|---|---|---|
| 5,596,420 A | 1/1997 | Daum | |
| 5,884,004 A * | 3/1999 | Sato | H04N 21/21805 386/337 |
| 5,956,729 A | 9/1999 | Goetz et al. | |
| 6,665,872 B1 * | 12/2003 | Krishnamurthy | H04N 21/4347 375/E7.218 |
| 6,754,241 B1 * | 6/2004 | Krishnamurthy | H04N 19/42 375/E7.218 |
| 6,993,251 B1 | 1/2006 | Phillips et al. | |
| 9,226,011 B2 | 12/2015 | Francisco | |
| 2002/0194589 A1 | 12/2002 | Cristofalo et al. | |
| 2004/0125877 A1 * | 7/2004 | Chang | G06F 16/739 348/E5.065 |
| 2005/0019020 A1 | 1/2005 | Sato et al. | |
| 2005/0204398 A1 | 9/2005 | Ryal | |
| 2005/0257239 A1 * | 11/2005 | Evans | H04N 5/783 386/E5.052 |
| 2006/0093045 A1 | 5/2006 | Anderson et al. | |
| 2007/0186002 A1 * | 8/2007 | Campbell | H04L 65/70 348/E7.084 |
| 2007/0196077 A1 | 8/2007 | Seo et al. | |
| 2009/0232220 A1 | 9/2009 | Neff et al. | |
| 2010/0269147 A1 | 10/2010 | Zetterower et al. | |
| 2012/0008045 A1 * | 1/2012 | Yao | H04N 21/44222 348/E9.034 |

(Continued)

*Primary Examiner* — Brian P Yenke
*Assistant Examiner* — Sean N. Haiem
(74) *Attorney, Agent, or Firm* — Banner & Witcoff, Ltd.

(57) ABSTRACT

Systems, methods, and apparatuses are described for detecting synchronization errors between audio and video signals. Scene changes may be detected based on anchor frames. Offsets between a scene change in a video signal and a reduced audio level or burst of high audio level in the audio signal may indicate a synchronization error.

29 Claims, 9 Drawing Sheets

(56) References Cited

U.S. PATENT DOCUMENTS

| | | |
|---|---|---|
| 2013/0141643 A1 | 6/2013 | Carson et al. |
| 2013/0156094 A1 | 6/2013 | Syed et al. |
| 2013/0219443 A1* | 8/2013 | Argyropoulos ...... H04N 17/004 |
| | | 725/109 |
| 2015/0189374 A1 | 7/2015 | Haberman et al. |
| 2015/0281752 A1* | 10/2015 | Van Veldhuisen ... H04N 21/233 |
| | | 725/116 |
| 2015/0373075 A1 | 12/2015 | Perlman et al. |
| 2016/0021397 A1* | 1/2016 | Stepin .................... H04N 19/65 |
| | | 375/240.12 |
| 2017/0064329 A1 | 3/2017 | Lawrence |
| 2017/0324888 A1 | 11/2017 | Boone et al. |
| 2017/0359601 A1 | 12/2017 | Sievers et al. |

\* cited by examiner

AUDIO VIDEO SYNCHRONIZATION

CROSS REFERENCE TO RELATED APPLICATIONS

This application is a continuation of U.S. application Ser. No. 16/035,528, filed on Jul. 13, 2018, the contents of which are incorporated herein by reference in its entirety.

BACKGROUND

During the recording and transmission of multimedia content, such as a football game or a movie, over a network and to a user, there may be times when audio and video signals for the multimedia content experience synchronization issues. For example, the audio signal may lag behind the video signal, or vice-versa, such that sounds are heard slightly before (or after) they should be heard. This may occur for a variety of technical reasons, such as delays in processing times for the audio signals and the video signals, delays introduced by recording equipment, transmission network links, etc. The technical causes for synchronization errors may not be constant or predictable.

SUMMARY

This summary is not an extensive overview, and is not intended to identify key or critical elements. The following summary merely introduces several features in a simplified form as a prelude to a more detailed description of those and other features.

Systems, methods, and apparatuses are described for detecting audio/video synchronization errors. There may be scene changes in a piece of audiovisual media content. During scene changes, there may be a new anchor frame. The new anchor frame may have no correlation to previous video frames and may coincide with, e.g., a silence or burst of high audio levels in accompanying audio. Video of a media stream may be processed to identify anchor frames indicative of a scene change. To help determine whether a particular anchor frame is indicative of a scene change, the system herein may look for unexpected anchor frames. A determination of a nearby moment of silence or burst of high audio levels in the audio, if offset by more than a threshold amount of time, may be indicative of a synchronization error.

These and other features and advantages are described in greater detail below.

BRIEF DESCRIPTION OF THE DRAWINGS

Some features herein are shown by way of example, and not by way of limitation, in the accompanying drawings. In the drawings, like numerals reference similar elements.

DETAILED DESCRIPTION

In the following description, reference is made to the accompanying drawings, which form a part hereof, and in which are shown various examples of how the disclosure may be practiced. Other examples may be utilized, and structural or functional modifications may be made, without departing from the scope of the present disclosure.

Figure 1:
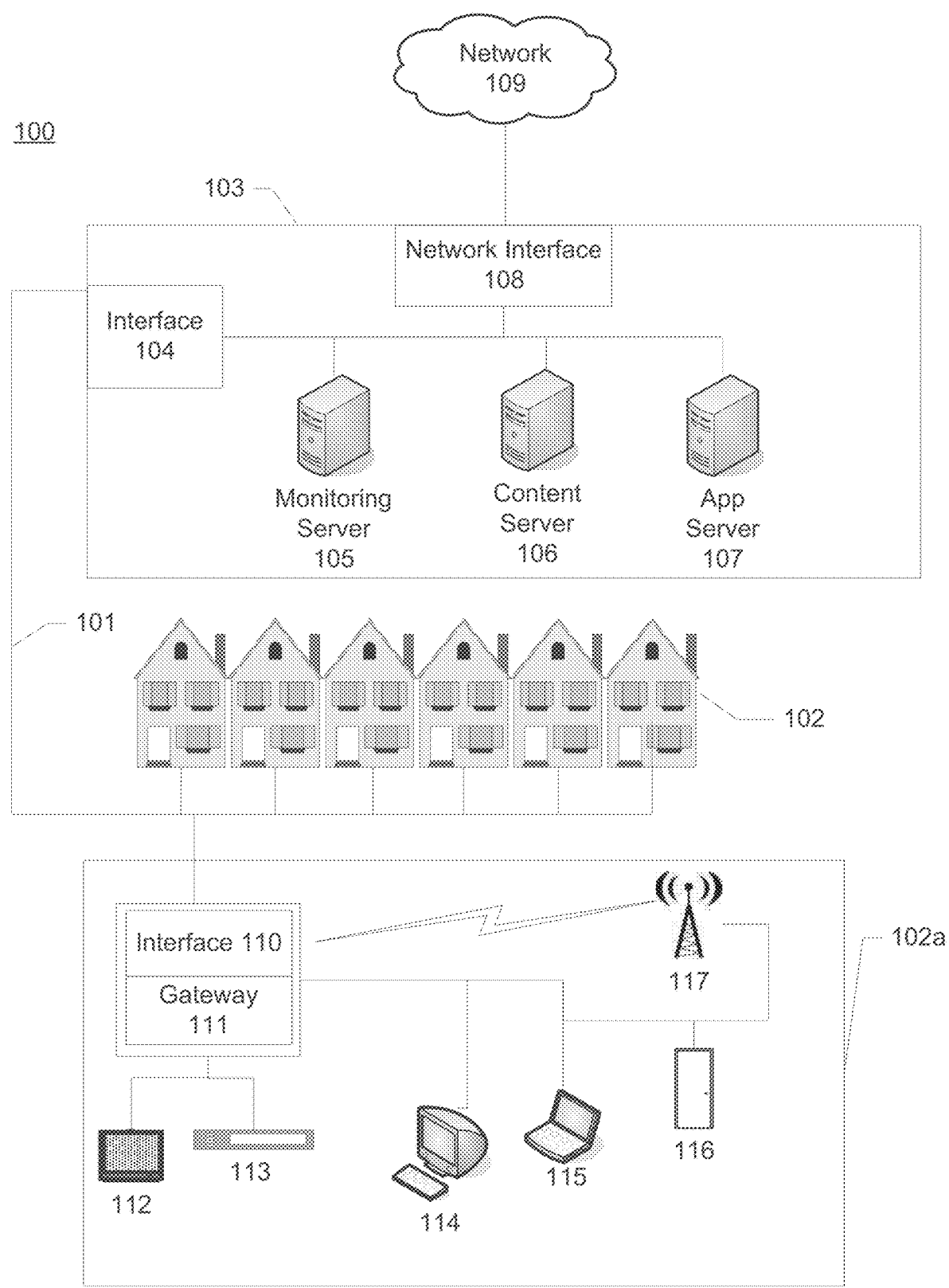
FIG. 1 shows an example communication network that may be used to implement features described herein.

FIG. 1 shows an example information distribution network 100 that may be used to implement features described herein. The network 100 may be any type of information distribution network, such as satellite, telephone, cellular, wireless, etc. One example may be a wireless network, an optical fiber network, a coaxial cable network, or a hybrid fiber/coax (HFC) distribution network. The network 100 may use a series of interconnected communication links 101 (e.g., coaxial cables, optical fibers, wireless, etc.) to connect multiple premises 102 (e.g., businesses, homes, consumer dwellings, etc., and/or other types of devices such as cellular interceptor towers, tablets, cell phones, laptops, and/or computers, etc.) to a local office 103 (e.g., a headend, a processing facility, a local exchange carrier, a gateway, a network center or other network facility, etc.). The local office 103 may transmit downstream information signals via the links 101, and each premises 102 may have one or more receivers and/or decoders used to receive and process those signals. A content analyzer may be used for monitoring audio-video signals and their associated synchronization errors associated with the network 100 and/or any other links used for distributing the media content. The content analyzer may be part of the network 100, downstream at a customer premises equipment (CPE) (such as a gateway, STB, video decoder, etc.), and/or may be part of a server or other computing device in the local office 103 or located elsewhere in the network 100. Audio-video signals may be analyzed by the content analyzer at various points along the network 100. For example, the audio-video signals may be analyzed at upstream locations (such as recording studios, broadcasting stations, routers, encoders, etc.) and/or at downstream locations (such as decoders, CPE, etc.).

There may be one or more links 101 originating from the local office 103, and they may be split a number of times to distribute the signal to various premises 102 in the vicinity (which may be many miles) of the local office 103. The links 101 may include components such as splitters, filters, antennas, amplifiers, etc. to help convey the signal clearly. The links 101 may be implemented with fiber-optic cable, coaxial cable, other types of lines, and/or wireless communication paths.

The local office 103 may include a termination system (TS) 104, such as a cable modem termination system (CMTS) in an example of an HFC-type network, which may be a computing device configured to manage communications between devices on the network of links 101 and backend devices such as the servers 105-107. In an HFC-type network, the TS may be as specified in a standard, such as the Data Over Cable Service Interface Specification (DOCSIS) standard, published by Cable Television Laboratories, Inc. (a.k.a. CableLabs), or the TS 104 may be a similar or modified device instead. The TS 104 may be configured to place data on one or more downstream frequencies to be received by modems at the various premises 102, and to receive upstream communications from those modems on one or more upstream frequencies. The local office 103 may also include one or more network interfaces 108, which may permit the local office 103 to communicate with various other external networks 109. These networks 109 may include, for example, Internet Protocol (IP) networks, internet devices, public switched telephone networks (PSTN), cellular telephone networks, fiber optic networks, local wireless networks (e.g., Z-wave, ZigBee, WiMAX, etc.), satellite networks, and any other desired network, and the interface 108 may include the corresponding circuitry needed to communicate on the network 109 and to other devices on the network 109, including mobile devices.

The local office 103 may include a variety of servers 105-107 that may be configured to perform various functions. For example, the local office 103 may include one or more content monitoring servers 105. The one or more content monitoring servers 105 may be one or more computing devices and may monitor media streams for synchronization errors between audio and video signals. The one or more content monitoring servers 105 may detect and isolate sources of the synchronization errors and/or trigger alarms indicative of the synchronization errors. The one or more content monitoring servers 105 may implement troubleshooting operations for correcting the synchronization errors, and/or may deliver data and/or commands to the various premises 102 in the network 100 (e.g., to the devices in the premises 102 that are configured to receive the audio and video signals) and/or to other computing devices in the network 100.

The local office 103 may also include one or more content delivery servers 106. The one or more content delivery servers 106 may be one or more computing devices that are configured to distribute content to users in the premises 102. This content may comprise movies, television content, audio content, text listings, security services, games, and/or other types of content. The content delivery server 106 may include software to validate (or initiate the validation of) user identities and entitlements.

The local office 103 may also include one or more application servers 107. The one or more application servers 107 may be may be one or more computing devices that may be configured to provide any desired service (e.g., monitoring services, media services, and applications), and may execute various languages and operating systems (e.g., servlets and JSP pages running on Tomcat/MySQL, OSX, BSD, Ubuntu, Red Hat Linux, HTML5, JavaScript, AJAX and COMET). For example, an application server 107 may be responsible for monitoring and controlling networked devices within the premises 102. Another application server 107 may be responsible for storing and retrieving user profile, social networking and emergency contact information, collecting television program listings information and generating a data download for electronic program guide listings. Another application server 107 may be responsible for monitoring user viewing habits and collecting that information for use in configuring content delivery and/or monitoring system settings. Another application server 107 may be responsible for formatting and inserting alert messages, alarm events, warnings, etc. in a video signal and/or content item being transmitted to the premises 102. Another application server 107 may perform various functions including monitoring different points in the media distribution network for synchronization errors, storing drift values corresponding to the synchronization errors, storing running average drift values corresponding to the synchronization errors, determining sources of the synchronization errors, implementing drift compensation for correcting the synchronization errors and/or other functions.

An example premises 102a may include an interface 110 (such as a modem, or another receiver and/or transmitter device suitable for a particular network (e.g., a wireless or wired network), which may include transmitters and receivers used to communicate via the links 101 and with the local office 103. The interface 110 may be, for example, a coaxial cable modem (for coaxial cable lines 101), a fiber interface node (for fiber optic lines 101), a cellular wireless antenna, a wireless transceiver (e.g., Bluetooth, Wi-Fi, etc.), and/or any other desired modem device. The interface 110 may be connected to, or be a part of, a gateway interface device 111. The gateway interface device 111 may be a computing device that communicates with the interface 110 to allow one or more other devices in the home and/or remote from the home to communicate with the local office 103 and other devices beyond the local office. The gateway 111 may comprise a set-top box (STB), a picocell, digital video recorder (DVR), computer server, monitoring system, and/or any other desired computing device. The gateway 111 may also include (not shown) local network interfaces to provide communication signals to other devices in the home (e.g., user devices), such as display devices 112 (e.g., televisions), additional STBs or DVRS 113, personal computers 114, wireless devices 115 (wireless laptops, tablets and netbooks, mobile phones, mobile televisions, personal digital assistants (PDA), etc.), sensors in the home (e.g., a door sensor, etc.), communication devices 117 (e.g., a cellular or a wireless site, an LTE antenna, etc.), and/or any other desired computers, audio recorders and transmitters, sensors, such as ambient light sensors, passive infrared sensors, humidity sensors, temperature sensors, and others. Examples of the local network interfaces may include Multimedia Over Coax Alliance (MoCA) interfaces, Ethernet interfaces, universal serial bus (USB) interfaces, wireless interfaces (e.g., IEEE 802.11), cellular LTE interfaces, Bluetooth interfaces, ZigBee interfaces, Z-Wave interfaces and others.

Figure 2:
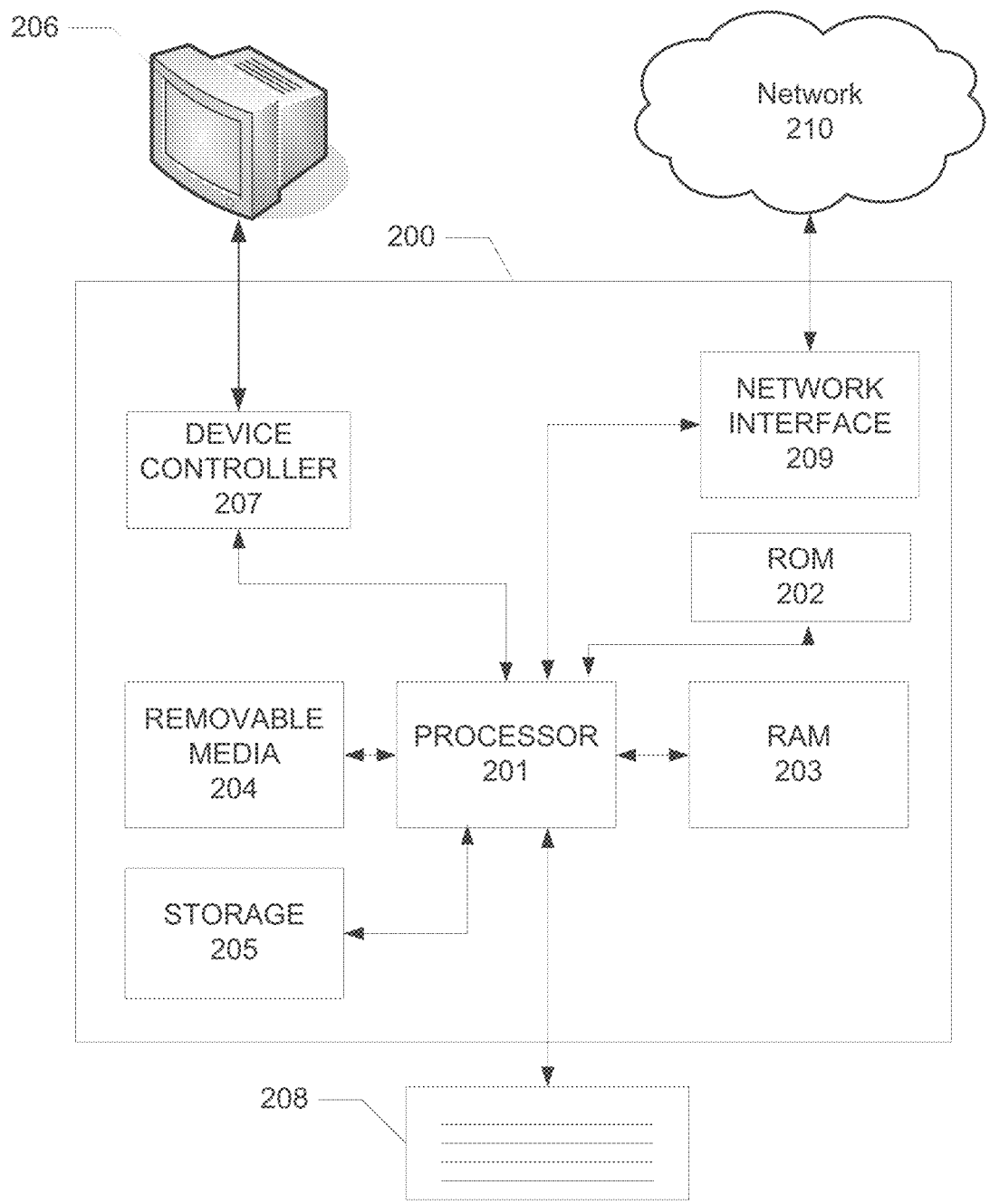
FIG. 2 shows an example computing device that may be used to implement any of the computing devices described herein.

FIG. 2 shows hardware elements of an example computing device 200 that may be used to implement one or more computing devices described herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, and/or any other desired electronic storage medium. Instructions may also be stored in an attached (or internal) storage 205 (e.g., hard drive, flash, etc.). The computing device 200 may include one or more output devices, such as a display 206, and may include one or more output device controllers 207, such as a video processor. There may also be one or more user input devices 208, such as a remote control, keyboard, mouse, touch screen, microphone, camera, etc. The interface between the computing device 200 and the user input devices 208 may be a wired interface, wireless interface, or a combination of the two, including IrDA interfaces, cellular interfaces, Bluetooth interfaces, ZigBee interfaces, and Z-Wave interfaces for example. The computing device 200 may also include one or more network interfaces, such as input/output circuits 209 (such as a network card) to communicate with an external network 210. The network interface may be a wired interface, wireless interface, or a combination of the two. The interface 209 may include a modem (e.g., a cable modem), and the network 210 may include the communication links 101 discussed above, the external network 109, an in-home network, a provider's wireless, coaxial, fiber, or hybrid fiber/coaxial distribution system (e.g., a DOCSIS network), and/or any other desired network. The modem may be integrated with a cellular antenna. A computing device such as computing device 200 may be configured to perform the operations described herein by storage of computer-readable instructions in a memory, which instructions may be executable by one or more processors of the computing device to perform such operations.

Modifications may be made to add, remove, combine, divide, etc. components of the computing device 200. Some or all of the components of the computing device 200 may be implemented using basic computing devices and components. Entities described herein may be software based, and may co-exist in a common physical platform (e.g., a requesting entity may be a separate software process and program from a dependent entity, both of which may be executed as software on a common computing device). One or more components of the computing device 200 may be implemented as software executing by one or more processors.

Computer-useable data and/or computer-executable instructions, such as in one or more program modules, may be stored in memory and executed by one or more processors of a computing device 200 to perform any of the operations described herein. Program modules may include routines, programs, objects, components, data structures, etc. that perform particular tasks or implement particular abstract data types when executed by a processor in a computer or other data processing device. Computer executable instructions may be stored on one or more computer readable media such as a hard disk, optical disk, removable storage media, solid state memory, RAM, etc. The functionality of program modules may be combined or distributed. Such functionality may be implemented in whole or in part in firmware or hardware equivalents such as integrated circuits, field programmable gate arrays (FPGA), and the like.

Figure 3:
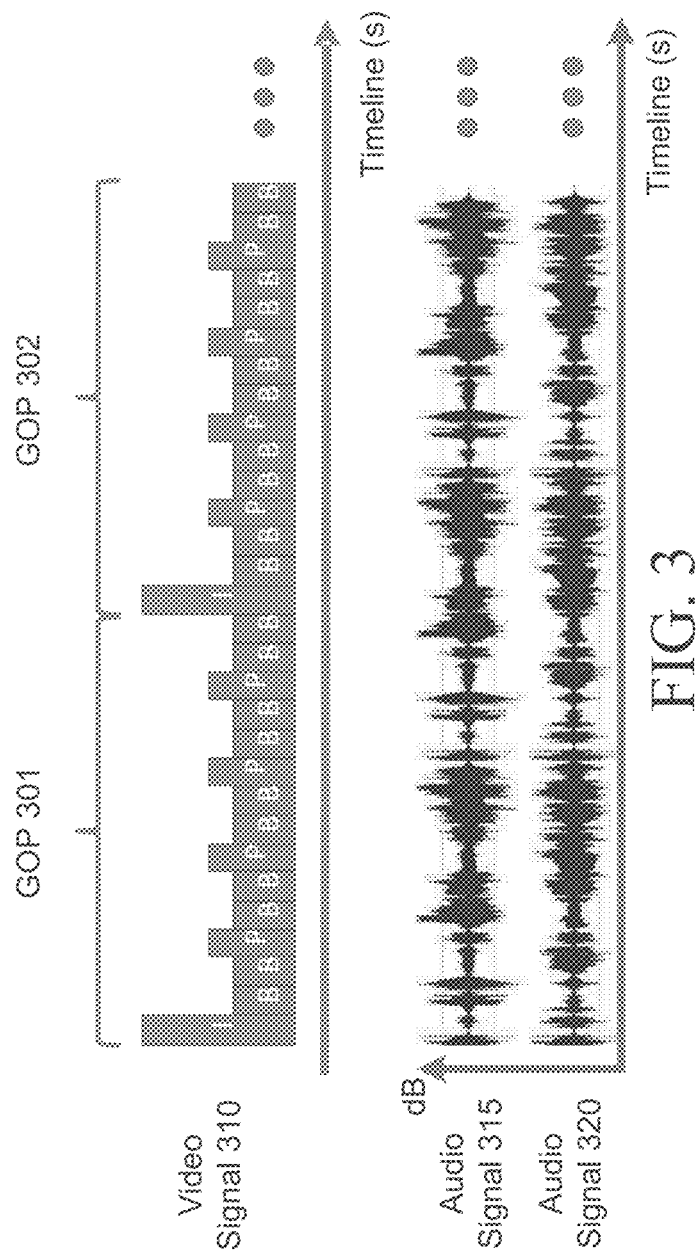
FIG. 3 shows an example timeline for video and audio signals.

FIG. 3 shows an example timeline for a synchronized video signal 310 and for audio signals 315 and 320 that do not comprise a scene change. The video signal 310 and the audio signals 315 and 320 may correspond to a first media stream. A media stream may comprise related audio and video signals for any type of content. The related audio and video signals may be transmitted together or separately (e.g., in separate logical and/or physical channels). A y-axis for the audio signals 315 and 320 may represent respective audio levels in dB for the audio signals 315 and 320. An x-axis for the audio signals 315 and 320 may be indicative of a system time (e.g., a time relative to a start of the first media stream). The video signal 310 and the audio signals 315 and 320 may be temporally aligned such that system times for the video signal 310 may directly correspond to system times for the audio signals 315 and 320. The video signal 310 may be an encoded video signal (e.g., according to a Moving Picture Experts Group (MPEG) standard or other standard) in an MPEG transport stream and may comprise one or more group of pictures (GOP) (such as GOP 301, GOP 302, etc.). Each GOP of the one or more GOP may comprise several frames (fifteen frames, thirty frames, ninety frames, one hundred and twenty frames, etc.) including one anchor frame. An anchor frame may be an Intra-frame (I-frame), e.g., Instantaneous Decoder Refresh frame (IDR-frame). One or more predictive (or predicted) frames (P-frames), and/or one or more bi-directional predictive frames (B-frames) may be included between I-frames, as shown in FIG. 3.

A first anchor frame of a first GOP from the one or more GOP may be indicative of a beginning of a video frame of the video signal 310 (e.g., an I-frame of the GOP 301 may be indicative of a beginning of a first video frame, an I-frame of the GOP 302 may be indicative of a beginning of a second video frame, etc.) A first set of GOP (e.g., the GOP 301 and the GOP 302) of the one or more GOP may comprise an expected number of frames (e.g., P-frames and B-frames) that may occur in a predetermined order as shown in FIG. 3. The expected number of the P- and B-frames may be determined based on a predefined GOP structure. For example, the GOP 301 may comprise four P-frames separated by two B-frames. The GOP structure may be based on a frame spacing between consecutive P-frames for each GOP of the first set of GOP. For example, the GOP 301 may comprise P-frames separated by two B-frames. The expected number of the P-frames and B-frames may be determined based on a size corresponding to each GOP of the first set of GOP. The first set of GOP and the audio signals 315 and 320 may correspond to a same scene of the video signal 310.

Figure 4A:
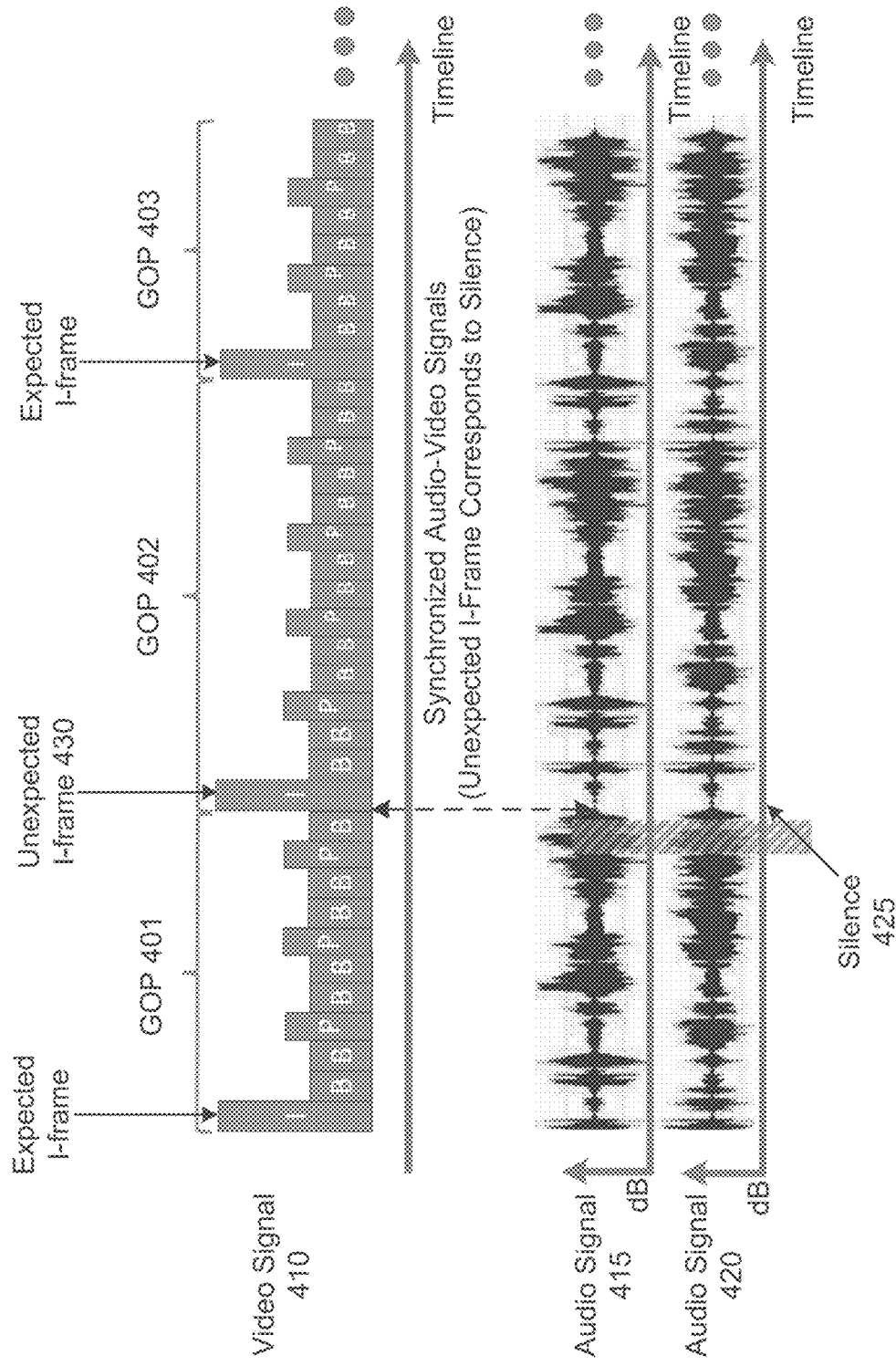
FIGS. 4A-B show additional examples of timelines for video and audio signals.

FIG. 4A shows a timeline of synchronized video signal 410 and audio levels for audio signals 415 and 420 that comprise a scene change. The video signal 410 and the audio signals 415 and 420 may correspond to a second media stream. The video signal 410 and the audio signals 415 and 420 may be temporally aligned and/or synchronized as described earlier with respect to FIG. 3. The video signal 410 may comprise one or more GOP (such as GOP 401, GOP 402, GOP 403, etc.). Verification of the temporal alignment of the video signal 410 and the audio signals 415 and 420 may be based on detecting an audio silence (e.g., audio silence 425) in the audio signals 415 and 420 that may be coincident and/or located in close proximity (e.g., within a duration of approximately 33 milliseconds, 1 second, etc.) to a start of a GOP (e.g., the GOP 402) from the one or more GOP of the video signal 410 as shown in FIG. 4A. During a scene change (or transition) in the video signal 410 there may be an accompanying audio silence, such as the audio silence 425, in the audio signals 415 and 420. Therefore, the audio silence 425 that is coincident with the start of the GOP 402 may be indicative of a scene change occurring in the second media stream. The verification of the temporal alignment of the video signal 410 and the audio signals 415 and 420 may be based on detecting an unexpected anchor frame (e.g., unexpected I-frame 430) occurring in the video signal 410 and determining a coincident audio silence (e.g., the audio silence 425) in the audio signals 415 and 420. An audio silence may be detected based on analyzing audio levels for the audio signals 415 and 420 and identifying audio levels that satisfy a predetermined audio level (or a predetermined audio threshold) over a predetermined audio duration. The audio silence may be detected based on detecting a predetermined drop in the audio levels (e.g., a decrease in the audio levels of approximately 10 dB or more, etc.) relative to a long-term minimum audio level of the second media stream or a predetermined decrease below a predetermined audio level (e.g., of approximately −80 dBFS) of the second media stream. The audio silence may vary from a few milliseconds (e.g., 1 ms, 5 ms, etc.) to many seconds (e.g., 2 seconds, 5 seconds, etc.). A content analyzer may be used for analyzing the video signal 410 and the audio signals 415 and 420 and performing the verification of the temporal alignment between the video signal 410 and the audio signals 415 and 420. The predetermined audio level and/or the predetermined drop in the audio levels may be based on a type of content of the second media stream. For example, a news program may require the predetermined drop in the audio levels for a scene change to be very low (e.g., 10 dB). For a sports program that has multiple contributing sources of audio and/or noise (e.g., from spectator stands, cheering fans, etc.) the long-term minimum audio level or audio floor may be higher than that for the news program and the predetermined drop in the audio levels during a scene change (e.g., advertisement break, etc.) may be high (e.g., 20 dB).

A first set of GOP (such as the GOP 402 and the GOP 403, etc.) of the one or more GOP may comprise an expected number of P-frames and B-frames that may occur in a predetermined order as described earlier with respect to FIG. 3. The video signal 410 may comprise a first GOP (e.g., the GOP 401) of the one or more GOP that comprises a different number of P-frames and/or B-frames from the expected number of P-frames and B-frames. A difference in the number of the P-frames and/or the B-frames may be indicative of a scene change occurring after a GOP in the video signal 410. For example, a lower number of P-frames and/or B-frames, of the GOP 401, than the expected number of P-frames and B-frames associated with an expected GOP structure of the video signal 410, may be indicative of a scene change occurring in the video signal 410. The scene change occurring in the video signal 410 may reduce a duration of the GOP 401 and may cause an unexpected transition from the GOP 401 to the GOP 402. An unexpected (or unscheduled) anchor frame (e.g., the unexpected I-frame 430) corresponding to the start of the GOP 402 may be indicative of a new scene. One or more unexpected anchor frames that may individually correspond to a second set of GOP comprising a varying number of P-frames and/or B-frames may be indicative of a plurality of scene transitions within the video signal 410. Information comprising the one or more unexpected anchor frames and/or information indicative of the scene change may be sent, as a separate transmission and/or metadata, before or along with the second media stream as supplemental enhancement information (SEI). The SEI information may comprise a presentation time stamp (PTS) information corresponding to the timeline of the audio signals 415 and 420.

The SEI information may be sent to a content analyzer, before or along with the second media stream. The content analyzer may identify the unexpected I-frame 430 corresponding to the start of the GOP 402 based on the SEI information. The content analyzer may analyze the audio levels for the audio signals 415 and 420 over a time duration (e.g., 33 milliseconds, 1 second, etc.) centered around a PTS that may correspond to the unexpected I-frame at the start of the GOP 402. The content analyzer may determine the audio levels for the audio signals 415 and 420 based on a moving time window analysis that looks for a drop in the long-term minimum audio level over the time duration or a drop below the predetermined audio level over the time duration. The moving time window analysis may detect audio levels that satisfy a predetermined audio threshold or comprise audio levels that are below the predetermined audio threshold. The content analyzer may identify an audio silence based on the moving time window analysis results (e.g., the drop in the long-term minimum audio level, the drop below the predetermined audio level, the predetermined audio threshold, the audio levels that are below the predetermined audio threshold. etc.). The content analyzer may determine that the audio silence (e.g., the audio silence 425) is coincident with or temporally positioned within an acceptable time duration of the occurrence of the unexpected I-frame at the start of the GOP 402. The content analyzer may conclude that the audio signals 415 and 420 and the video signal 410 are in-sync. The content analyzer may initially analyze the audio signals 415 and 420 for identifying the audio silence (e.g., the audio silence 425) and analyzing a portion of the video signal 410 at a system time (e.g., a time relative to a start of the second media stream) that may be close to a PTS corresponding to the audio silence. The content analyzer may detect an unexpected anchor frame within the analyzed portion of the video signal 410. For example, the content analyzer may detect the unexpected I-frame at the start of the GOP 402 and may conclude that the video signal 410 and the audio signals 415 and 420 are in-sync based on the audio silence 425 being temporally aligned with the unexpected I-frame of the GOP 402. Alternatively, verification of the temporal alignment of the video signal 410 and the audio signals 415 and 420 may be based on detecting a burst of high audio levels in the audio signals 415 and 420 that may be coincident and/or located in close proximity (e.g., within the duration of approximately 33 milliseconds, 1 second, etc.) to the start of a GOP of the video signal 410.

Figure 4B:
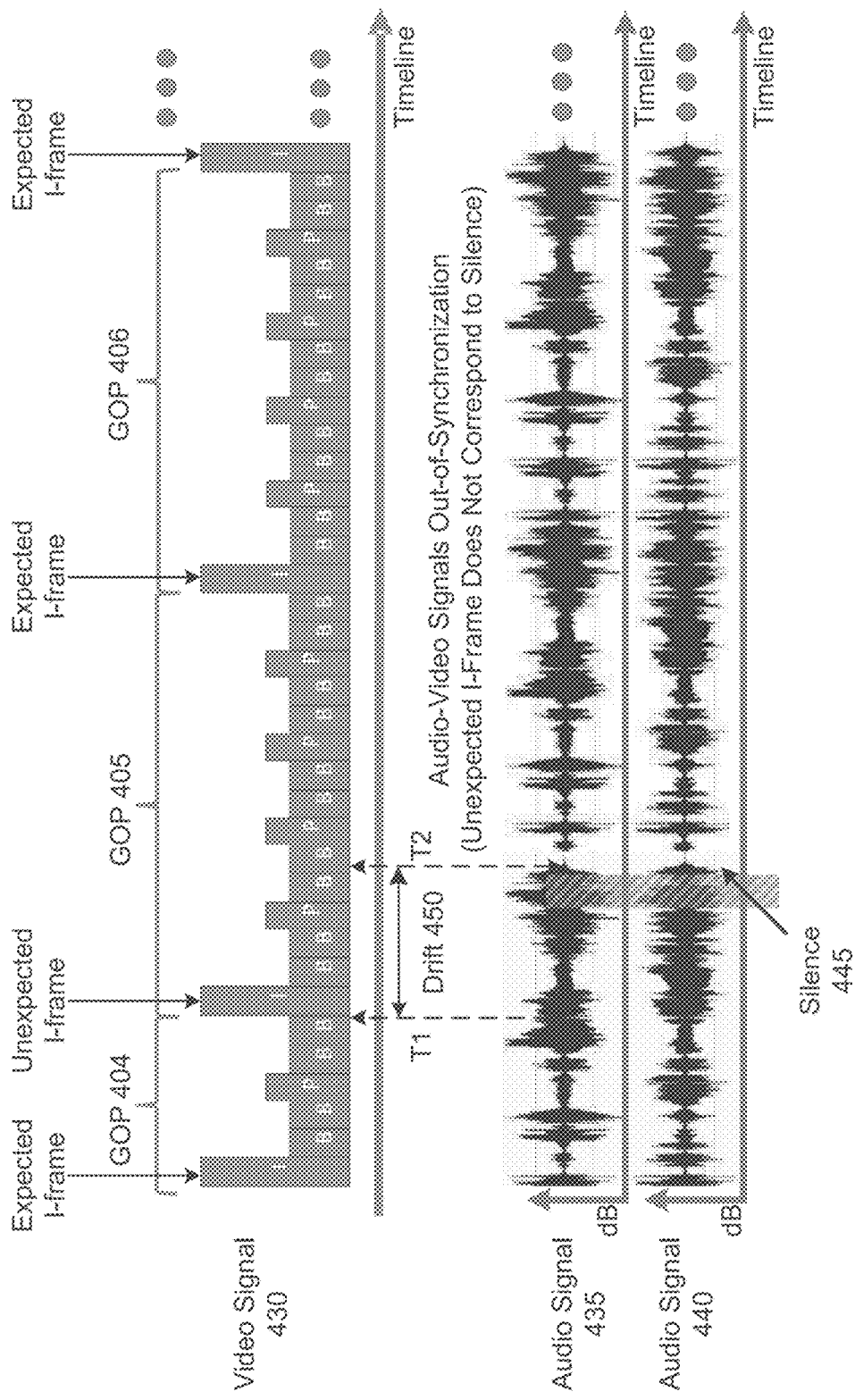
Figure 5A:
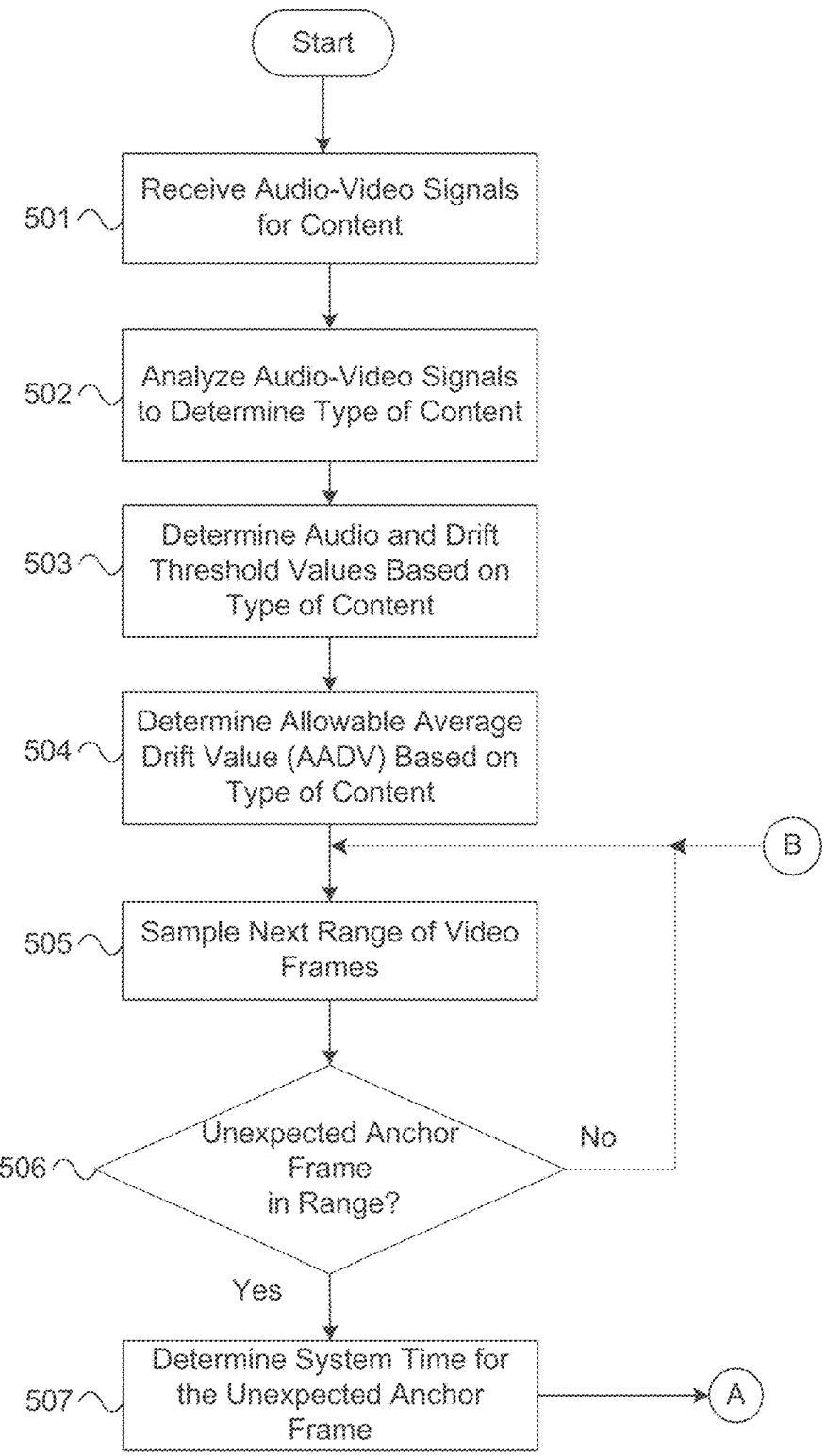
FIGS. 5A-D are a flow diagram of an example method for detecting synchronization errors.
Figure 5B:
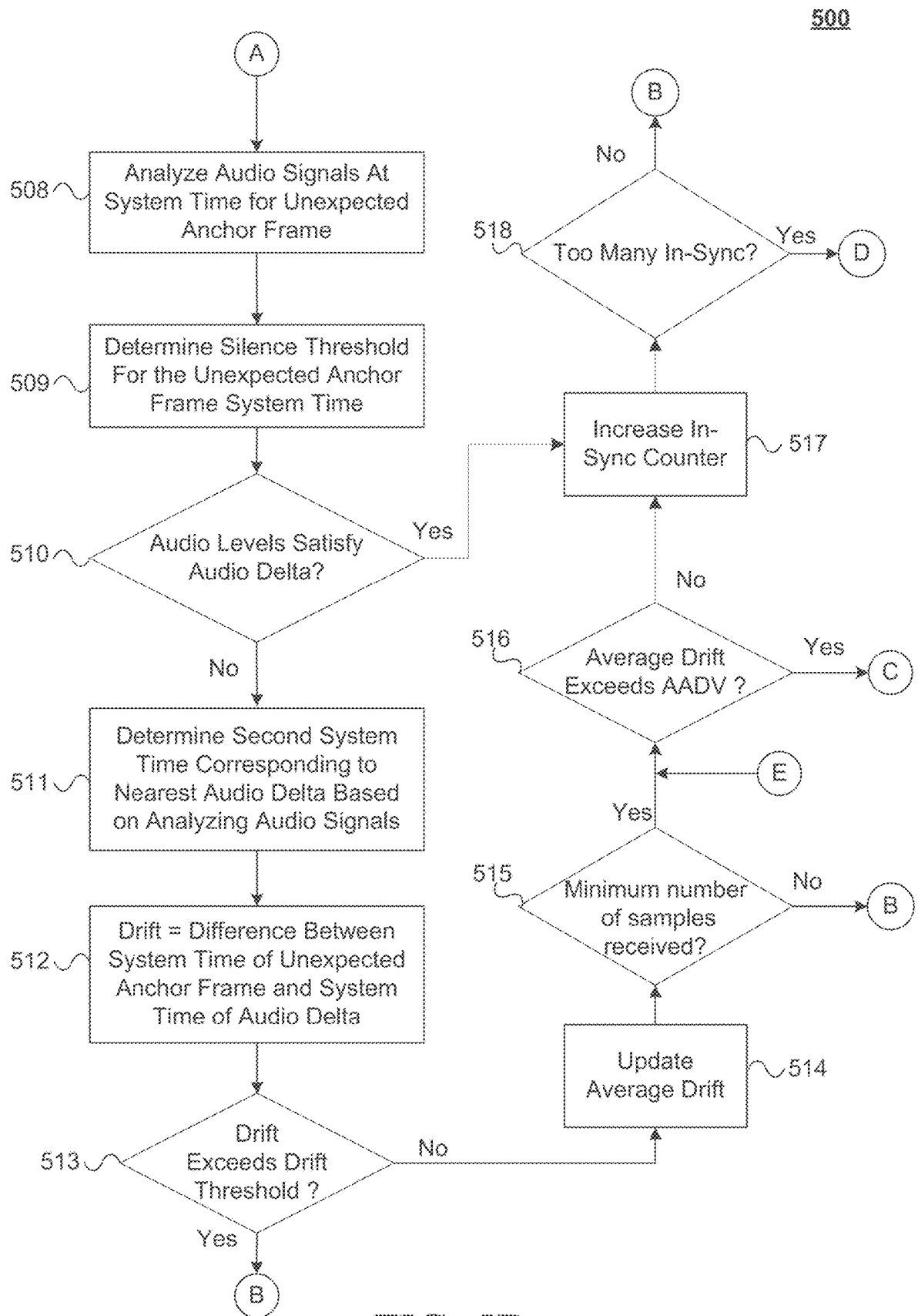
Figure 5C:
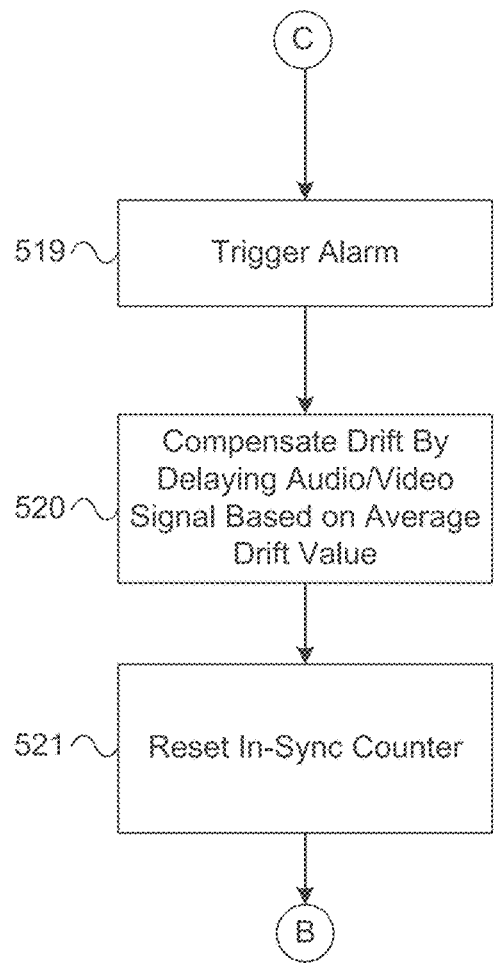
Figure 5D:
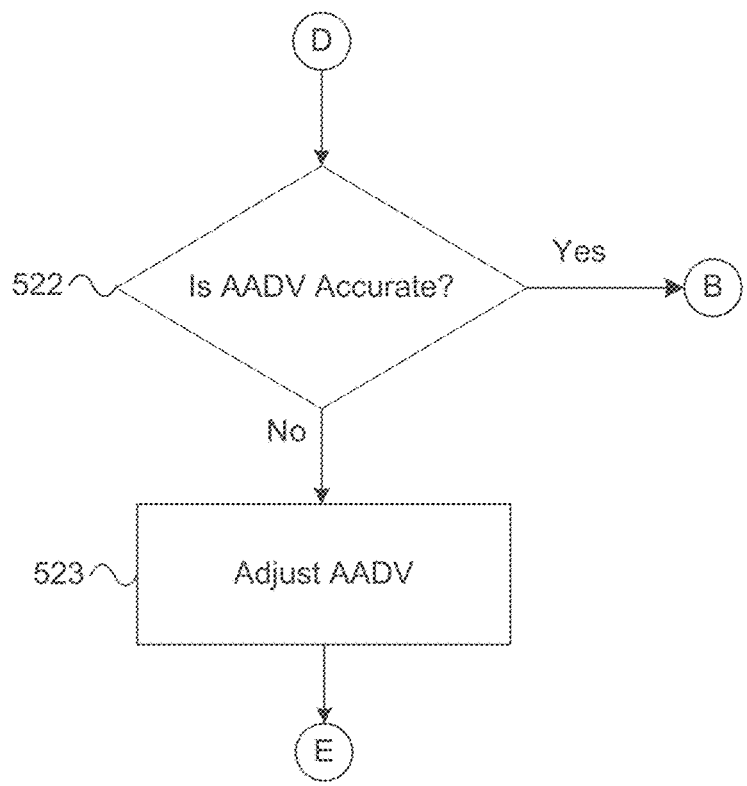

FIG. 4B shows a timeline of a video signal 430 and audio signals 435 and 440, wherein the video signal 430 is out-of-sync with the audio signals 435 and 440. The video signal 430 and the audio signals 435 and 440 may correspond to a third media stream. The video signal 430 comprises one or more GOP (such as GOP 404, GOP 405, GOP 406, etc.). Information comprising one or more unexpected anchor frames (e.g., an I-frame at the start of the GOP 405, an IDR frame, etc.) and/or information indicative of a scene change in the video signal 430 may be sent as a separate transmission and/or metadata before or along with the third media stream as SEI information for the third media stream. The SEI information for the third media stream may comprise PTS information corresponding to the audio signals 435 and 440. The video signal 430 and the audio signals 435 and 440 may be temporally aligned initially (e.g., before the introduction of any synchronization errors) such that system times (e.g., a time relative to a start of the third media stream) for the video signal 430 may directly correspond to the PTS for the audio signals 435 and 440. The content analyzer may determine a first system time, T1, corresponding to the unexpected anchor frame and search for an audio delta (e.g., audio silence 445, a burst of high audio levels, etc.) in the audio signals 435 and 440 that are located within a predetermined temporal proximity from the first system time T1. The first system time T1 may be determined based on the SEI information for the third media stream. The predetermined temporal proximity may be based on determining a type of content associated with the video signal 430 and the audio signals 435 and 440.

If no audio delta is found to correspond to the first system time, the content analyzer may determine a second system time, T2, that corresponds to an audio silence or burst of high audio levels located in closest temporal proximity to the first system time T1. A drift value (e.g., drift 450) may be estimated based on the temporal difference between the first system time T1 and the second system time T2. The content analyzer may correct the temporal misalignment between the video signal 430 and the audio signals 435 and 440 by compensating for the drift 450 and introducing a delay in the audio signals 435 and 440. The content analyzer may correct the temporal misalignment between the video signal 430 and the audio signals 435 and 440 by compensating for the drift 450 and introducing a delay in the video signal 430. The delay may be proportional to an absolute value of the drift 450 (T2−T1) which may be positive or negative depending upon whether the video signal 430 leads or lags the audio signals 435 and 440. The content analyzer may look-up a drift threshold profile for the third media stream that comprises multiple drift threshold values respectively corresponding to a different portion of the third media stream. If the drift 450 exceeds a first drift threshold corresponding to a portion of the third media stream around system time T1, the content analyzer may discard the drift 450 value. This may prevent an unexpected anchor frame that does not correspond to a scene change from being aligned with a nearest audio delta (such as an audio silence or burst of high audio levels). If the drift 450 does not exceed and/or satisfies the first drift threshold, the content analyzer may log the drift 450 value and/or update a running average of the drift value (ADV). The ADV may be an average of all detected drift values for the third media stream. Further details are provided in steps 512-522 of flow 500.

FIGS. 5A-D are a flow diagram of an example method 500 for determining synchronization errors in a media stream. One, some, or all of the steps shown in FIGS. 5A-D and/or one or more additional or alternative steps may be performed by one or more content analyzers and/or other computing devices. The method 500 shown in FIGS. 5A-D may be performed by one or more servers that are communicatively coupled to the local office 103, content service provider facility, broadcasting station, etc. or by one or more servers that are communicatively coupled to the network facilities, distribution relays, satellite transmissions/receptions/links, encoders/decoders, etc. The steps in the flow diagram of FIGS. 5A-D need not all be performed in the order specified and/or some steps may be combined, omitted, or otherwise changed.

In step 501, the content analyzer may receive a video signal (such as the video signal 310, 410 or 430 of FIGS. 3, 4A and 4B) and one or more audio signals (such as the audio signals 415, 420, 435, and/or 440 of FIGS. 3, 4A and 4B) corresponding to media content (such as the first media stream, the second media stream or the third media stream described earlier with respect to FIGS. 3, 4A and 4B) from the network 100. The video signal may be an encoded video signal (e.g., MPEG, MPEG-4, flash video format, windows media video, etc.). The video signal and the one or more audio signals may correspond to an audio-video interleave (AVI) format of encoded media delivery. The video signal may be an unencoded baseband video signal that may correspond to content recorded from a source (such as a local station, live broadcast, etc.) without encoding and the one or more audio signals may be unencoded, baseband audio signals. The one or more audio signals may be converted from an analog format into a digital format via pulse code modulation, by encoding to AC-3, eAC3, or other compressed audio format, and/or in other ways. The video signal and the one or more audio signals may be transported to a local office, the interface 110, broadcast station, etc. as digital signals over the network 100.

In step 502, the content analyzer may analyze the media content in order to determine a type of content. For example, the content analyzer may analyze the media content based on metadata, program guide information corresponding to the media content, a frame rate, a bit rate, a number of audio channels of the media content, and/or any other information. Different types of content may be sent (e.g., broadcast, transmitted, etc.) from different broadcasting stations, radio links, etc. comprising different network elements (and/or links) that may introduce different types of synchronization errors during encoding and/or decoding of the media content. Multiplexing and/or demultiplexing different types of content originating from differing sources of media for transmission over common transmission resources may introduce synchronization errors into the media content. For example, capturing a live sport broadcast using multiple microphones and cameras may require synchronization of multiple audio and/or video feeds that may travel different paths and experience different path delays leading to overall synchronization errors when combined for long-distance transmission to a CPE. Mixing different media content streams may introduce synchronization errors. For example, with increasingly diverse sources and resolution of content, editing and mixing multiple different media streams with differing resolutions, encoding and/or travel paths may result in the accumulation of increasing synchronization errors. Knowing the type of content may help predict synchronization errors by correctly identifying and isolating sources of the synchronization errors, and aid in the implementation of corrective protocols.

In step 503, the content analyzer may determine how low or high a sound level should be in order to qualify as an audio delta (such as the audio silence 425 and 445 or bursts of high audio levels). The content analyzer may determine a respective audio threshold for the low sound level and for the high sound level based on the type of content. For example, some programs (e.g., a football game) may have higher background audio levels due to cheering from enthusiastic fans than other programs (e.g., a talk show, a documentary, etc.). In step 503, the content analyzer may set a higher audio threshold (e.g. a higher silence threshold, a higher audio delta function, etc.) for the football game than for the talk show to be used later in detecting silences or bursts of high audio levels. The type of content may be determined based on analyzing program guide information, metadata for the content, and/or any other desired method determining the type of content. There may be multiple audio threshold values (e.g., silence threshold values, etc.) associated with a media stream. For example, the football game may comprise durations of high audio levels during gameplay and durations of low audio levels during time-outs. The content analyzer may assign different audio thresholds for different sections of the football game (such as gameplay duration, time-out duration, ad breaks, etc.). For example, a section of football gameplay with a long-term minimum audio level of approximately −5 dBFS may have a silence threshold of approximately −50 dBFS, while a section of ad-break with a long-term minimum audio level of −10 dBFS may have a silence threshold of around −80 dBFS. The multiple audio thresholds may comprise a silence threshold profile and/or a high audio threshold profile for the football game.

Drift thresholds may be higher for some programs (e.g., the football game), wherein the video signals and audio signals may be able to tolerate a higher amount of synchronization error before synchronization errors in some programs are perceivable by viewers of those programs. Drift thresholds may be lower for some other programs (e.g., a news broadcast), wherein viewers may easily notice even slight synchronization errors (e.g., a synchronization error between a news broadcaster's lip movements and a corresponding audio output).

In step 504, the content analyzer may determine an allowable average drift value (AADV). The AADV may be indicative of a synchronization tolerance (e.g., 16 ms, 35 ms, etc.) between the video signal and the one or more audio signals and may be based on determining one or more synchronization errors between the video signal and the one or more audio signals. For example, a synchronization error (e.g., of a few milliseconds) that may be lower than a frame duration (e.g., a range of approximately 16 ms up to 35 ms) for a media stream of the talk show may be allowable because such a low synchronization error may go unnoticed by viewers of the talk show. The AADV may be based on the type of content. For example, the AADV may be higher for some programs (e.g., the football game) than for other programs (e.g., the talk show). This is because the higher background noise levels for the football game may make it difficult for viewers to notice slight synchronization errors in a football video signal and audio signals associated with the football game. The content analyzer may determine the AADV based on the threshold drift value for the media content as calculated in step 503. The content analyzer may determine the drift threshold value for the media content based on the type of content. The AADV may be based on a combination of the threshold drift values, the synchronization tolerance, the synchronization errors, and/or average drift values (ADV). The ADV may be determined based on the type of content, network delays, sources of synchronization errors in the network 100, etc. The AADV may be determined based on factoring in some type of combination of the type of content, the ADV and the threshold drift values. For example, if the content analyzer determines a high drift threshold value for the football game, it may result in overall higher cumulative drift values than for the news broadcast wherein the threshold drift values are set lower resulting in lower overall cumulative drift values.

In step 505, the content analyzer may sample a first range of video frames of the video signal for analyzing a temporal alignment between the first range of video frames and the one or more audio signals. A number of the video frames sampled and/or the first range of video frames sampled may be determined based on at least one of a content format, an encoding type, an MPEG GOP duration, the type of content, SEI, a frame rate, a sampling interval, etc. For unencoded media content, the content analyzer may select a portion of the baseband video signal of the unencoded media content and may carry out an analysis of temporal alignment between audio-video signals of the unencoded media content. The content analyzer may determine a sampling interval (e.g., 1 second) between consecutive ranges of sampled video frames or may continuously compare each individual video frame to the next video frame.

In step 506, the content analyzer may analyze the first set of video frames to determine whether at least one unexpected anchor frame of the first set of video frames corresponds to a scene change. If the content analyzer identifies an unexpected anchor frame, of the first set of video frames, corresponding to a scene change, Yes, at step 506, the content analyzer may proceed to step 507 for determining a system time (such as a time relative to a start of the video signal or the PTS in the case of an MPEG encoding) that corresponds to the unexpected anchor frame. If the content analyzer determines that no video frames of the first set of video frames correspond to a scene change, No, at step 506, the content analyzer loop back to step 505 and proceed to sampling a second set of video frames from the video signal. The content analyzer may proceed to sampling the second set of video frames after waiting for a predefined time duration that may be based on at least one of the type of content, the frame rate, the SEI, the metadata, network bandwidth, etc.

An unexpected anchor frame may be identified by the content analyzer as described earlier with respect to FIGS. 4A-B and/or analyzing the SEI associated with the video signal. For an unencoded baseband video signal, the content analyzer may use scene changes or scene transitions within the portion of the baseband video signal that has been sampled or use metadata indicative of the scene changes. The frames corresponding to the scene changes may be determined based on a combination of abrupt changes in the video frames such as fading to black, bursts of white, etc.

In step 507, the content analyzer may determine a first system time (e.g., T1) for the unexpected anchor frame. In the case for the encoded video frames, the first system time may correspond to a PTS that may be a metadata field in MPEG encoded media content. For unencoded video signals, the first system time may correspond to a point in time of the unencoded video signals at which the scene change occurs.

In step 508, the content analyzer may determine a portion of the one or more audio signals that correspond to the first system time for the unexpected anchor frame. The portion of the one or more audio signals may occur within a time window centered at approximately the system time for the unexpected anchor frame. For example, the time window may span system times given by the first system time, T1, plus a value delta $\delta$ and T1−$\delta$. The portion of the one or more audio signals that approximately falls within the time window (such as T1+$\delta$ and T1−$\delta$) may be analyzed. For example, decibel (audio) levels of the portion of the one or more audio signals may be analyzed by applying a window function. The audio levels may be determined via audio spectrum analysis (e.g., moving time-window analysis, and/or Fourier transform analysis of the audio spectrum portion).

In step 509, the content analyzer may use an audio threshold (e.g., silence threshold, high audio threshold, audio delta, etc.) or select an audio threshold from the audio threshold profile, of step 503, based on a combination of the type of content, the portion of the one or more audio signals being analyzed, and the first system time for the unexpected anchor frame. For example, the audio threshold may be selected depending upon whether a system time or timestamp for a portion of the football game being analyzed corresponds to half-time, time-out, or game play. The content analyzer may receive metadata that is indicative of respective system times that correspond to the half-time, the time-out, or the game play for the sports broadcast. The content analyzer may use the respective system times to select the audio threshold and may improve detection accuracies for the audio deltas.

In step 510, the content analyzer may determine whether the audio levels from step 508 satisfy the audio threshold value of step 509. For example, if the audio levels for the portion of the one or more audio signals are below the silence threshold or above the high audio threshold value, the content analyzer may determine that the portion of the audio satisfies an audio delta (e.g., are lower than the audio silence threshold or higher than the high audio threshold), Yes, at step 510. The content analyzer may determine that the audio delta corresponds to the scene change information and that the audio-video signals are in-sync. The content analyzer may then proceed to step 517. If the audio levels do not satisfy the audio delta (e.g., the audio levels are greater than the silence threshold or less than the high audio threshold value), the content analyzer may determine that the portion of the audio does not correspond to silence (No, at step 510) or drastic changes in the audio levels. The content analyzer may then determine that the portion of the audio signals are not useful for identifying a scene change and may proceed to step 511 to analyze a different portion of the one or more audio signals to search for the nearest audio delta (e.g., silence or burst of high audio levels).

In step 511, the content analyzer may analyze the audio signals to determine a second system time, T2, for an audio delta (such as a silence or burst of high audio levels) that is positioned nearest to the first system time T1. The determination of the second system time T2 may be based on analyzing audio signals within a second time window centered at approximately the first system time T1 and comprising a time span that may be greater than the first time window. For example, the second time window may span system times given by the first system time, T1, plus a value delta $\delta 2$, that may be greater than $\delta 1$, and T1−$\delta 2$. The audio signals that fall within this time window T1+$\delta 2$ and T1−$\delta 2$ may be analyzed as described above with respect to step 508. For example, decibel levels of the audio signals may be analyzed by applying a window function (e.g., a rectangular window function). The value of $\delta 2$ may be based on at least one of the type of content, a portion of the media content, SEI associated with the media content, metadata corresponding to the media content, or the first system time (such as a first PTS). The content analyzer may then determine the nearest audio delta in a process similar to the one described in steps 508 and 510 and may identify a plurality of audio levels. The content analyzer may determine second audio levels from the plurality of audio levels that satisfy the threshold values for the audio delta that was determined in step 509. The content analyzer may determine the second system time T2 that corresponds to the nearest audio delta (e.g., silence or the high audio levels) based on system times (e.g., PTS) that correspond to the second audio levels. If no audio delta is found within the time window spanning T1+$\delta 2$ and T1−$\delta 2$, the content analyzer may increase $\delta 2$. For example, $\delta 2$ may be increased by a factor of 2. The audio signals that fall within this increase time window may be analyzed as described above with respect to step 508. If no audio delta is found within the increased time window, the content analyzer may continue to increase the value of $\delta 2$ until a silence or a burst of high audio levels is found, the time window duration exceeds the duration of the content, or the value of $\delta 2$ exceeds that of the drift threshold. If more than one audio silence or burst of high audio levels are identified within the time window spanning T1+$\delta 2$ and T1−$\delta 2$, and the audio silences or bursts of high audio levels are equally spaced apart from each other, the content analyzer may reject the audio signals within the second time window and the sampled range of video frames and move onto sampling a next range of video frames as described earlier in step 505.

In step 512, the content analyzer may calculate a drift value that provides a numerical estimate of the synchronization error (mismatch) between the video signal and the one or more audio signals. The drift may be calculated by the content analyzer as being approximately equal to the first system time minus the second system time. The drift value may be positive or negative depending upon whether the audio signals are lagging or leading as compared to the video signals. For example, if the audio signals are leading, the drift value may be positive. The opposite may be true if the audio signals are lagging. The drift value may be calculated based on a difference between the first system time and the second system time or vice-versa.

In step 513, the content analyzer may compare the drift (e.g., the drift 450) and the drift threshold for the analyzed portion of the audio signals. If the drift exceeds the drift threshold, Yes at step 513, as described earlier with respect to FIG. 4B, the content analyzer may discard the drift for the sampled range of video frames and move onto sampling the next range of video frames. There may be occasions during which the unexpected anchor frame is not supposed to correspond to and/or align with an audio delta (such as a silence or burst of high audio levels). The drift threshold helps prevent outlying drifts that exceed an allowable drift value set by the drift threshold from being taken into consideration. If the drift does not exceed the drift threshold, No at step 513, the content analyzer may proceed to may proceed to update an average drift based on the drift estimated in step 512.

In step 514, the content analyzer may update the ADV, as described earlier with respect to step 504, based on the drift value calculated in step 512. For example, if an ADV is +20 ms, as determined from a prior sampled range of video frames, and the currently determined drift value is +22 ms, the content analyzer may calculate an updated ADV of $$\frac{20+22}{2} = +21 \text{ ms.}$$

If an ADV is +20 ms, as determined from two prior sampled range of video frames (N−1), where N is an integer indicative of how many times the video has been sampled, and the currently determined drift value (CDV) is +32 ms, the content analyzer may calculate an updated ADV of $$\frac{(ADVx(N-1)) + CDV}{N} = +24 \text{ ms.}$$

These examples include equal weighting for all the sampled range of video frames and the content analyzer may assign different weights to each of the sampled range of video frames depending upon a sequence number of each of the sampled range of video frames or a time at which the sampling took place for each of the sampled range of video frames.

At step 515, the content analyzer may determine whether a minimum number of drift values have been received before comparing the ADV of step 514 with the AADV in step 516. This may help prevent utilization of inaccurate drift values that may not correspond to synchronization errors, and may reduce inaccuracies in the detection and/or mitigation of synchronization errors. For example, the content analyzer may estimate a first set of drift values of 400 ms, 50 ms, and 49 ms, in temporal order, for the media content, wherein 400 ms corresponds to a first drift value identified for the content at a system time of 10 seconds into the content and 49 ms corresponds to a third drift value identified for the content at a system time of 5 minutes into the content. If the drift threshold for the content is 500 ms, each drift value of the first set of drift values lies below the drift threshold and is utilized in calculating the ADV in step 514. However, if the minimum number of drift values for the media content is predetermined to be at least five, then the content analyzer will continue to sample a next range of video frames until at least five drift values have been identified. The content analyzer may then proceed to step 516 and compare the ADV that is based on the minimum number of drift values to the AADV. This may avoid utilization of an initial number of drift values that may be determined at a start of the media content and are less than the minimum number of drift values.

In step 516, the content analyzer may compare the updated ADV to the AADV (as determined in step 504). If the updated ADV exceeds the AADV, (Yes, at step 516) the content analyzer may proceed to step 519 (e.g., the updated ADV is higher than the AADV) for triggering an alarm. For example, if an updated ADV is +26 ms and the AADV is +/−25 ms, the content analyzer may determine that the updated ADV is not within a range of allowable drift values given by the AADV and proceed to trigger corrective actions at step 519. If the drift value does not exceed the AADV, (No, at step 516), the content analyzer may proceed to step 517 (e.g., the updated ADV is less than the AADV) for increasing an in-sync counter. For example, if the AADV is +/−25 ms and an updated ADV is +21 ms, the content analyzer may determine that the updated ADV is within the range of allowable drift values given by the AADV of +/−25 ms and may proceed to step 517.

In step 517, the content analyzer may incrementally increase the in-sync counter with each sampled range of video frames that are determined to be in-sync with the audio signals. The in-sync counter may be useful for identifying synchronization errors in the audio-video signals of a media stream when at least one of the drift threshold profile, AADV, audio threshold, or the type of content are determined incorrectly.

In step 518, the content analyzer may determine whether too many sampled video frames have been determined to be in-sync with the audio signals. For example, it may be estimated that during a recording and/or broadcast of a football game, at least one synchronization error may be expected to occur by half-time. However, if the content analyzer fails to find any synchronization error by half-time, the content analyzer may determine that too many sampled video frames appear to be in-sync with the audio signals and that there may be an undetected error in verifying the temporal alignment between the audio-video signals. The content analyzer may then proceed to step 522, Yes at step 518, to verify whether the AADV is accurate. If the content analyzer determines that not too many sampled video frames are in-sync, No at step 518, the content analyzer may proceed to sampling the next range of video frames for temporal analysis as described earlier in step 505.

In step 519, the content analyzer may trigger an alarm that may be indicative of a request to a user to implement corrective actions. For example, the request may be indicative of synchronization errors arising due to changes in bandwidth associated with the network 100. The user may address the synchronization errors based on the changes in the bandwidth. The alarm may comprise information indicative of one or more corrective actions that may be performed by the user for addressing the synchronization errors between the video signal and the one or more audio signals of the media content. The alarm may be indicative of a range of probable threshold drift values, and/or the audio threshold values.

In step 520, the content analyzer may implement drift compensation to correct the synchronization error between the video signal and the one or more audio signals of the media content. The content analyzer may delay the one or more audio signals to temporally align the video signal with the one or more audio signals. For example, the content analyzer may delay the one or more audio signals by an amount proportional to the ADV, the updated AADV, the initial AADV, and/or some combination of the threshold drift value, the updated AADV and the initial AADV. The content analyzer may delay the video signal to temporally align the video signal with the one or more audio signals. For example, the content analyzer may delay the video signal by an amount proportional to the ADV, the updated AADV, the initial AADV, and/or some combination of the threshold drift value, the updated AADV and the initial AADV. The content analyzer may loop back to step 505 to continue sampling additional portions of the video signal.

In step 521, the content analyzer may reset the in-sync counter.

In step 522, the content analyzer may determine whether the initial AADV is accurate based on a number of times the sampled video frames have been dropped consecutively as described earlier in step 518. For example, incorrect determination of the type of content may cause errors in estimating an initially accurate AADV value. If the content analyzer determines that the initial AADV is accurate, Yes, at step 522, the content analyzer may loop back to step 505 and sample a next set of video frames of the video signal. Alternatively, if the content analyzer determines that the initial AADV is incorrect, No, at step 522, the content analyzer may proceed to step 523 in order to make adjustments to the AADV value.

In step 523, the content analyzer may adjust the inaccurate AADV based on re-analyzing the video signal and the one or more audio signals to determine a second type of the content, second audio threshold values, one or more sources of the synchronization errors and/or different drift threshold values. The content analyzer may then update (modify or adjust) the inaccurate AADV based on the second type of the content, the second audio threshold values, the one or more sources of the synchronization errors and/or the different drift threshold values. The content analyzer may proceed to step 516 to determine whether the ADV still exceeds the updated AADV.

The content analyzer may align the video signal and the one or more audio signals of the media content by either analyzing the video signal initially or analyzing the one or more audio signals initially. The steps of FIGS. 5A-D may initially be performed, and the content analyzer may thereafter proceed to verifying the temporal alignment between the audio-video signals based on analyzing the one or more audio signals first. Alternatively, there may be situations during which a sampled portion of the video signal may not comprise any unexpected anchor frames and/or there may be no scene transition indications. In such situations, the content analyzer may sample a corresponding portion of the one or more audio signals to verify that there is an absence of an audio delta and/or there is no indication of a scene transition in the sampled portion of the one or more audio signals as well.

It will be understood by those skilled in the art that the disclosure is not limited to the examples provided above and in the accompanying drawings. Modifications may be made by those skilled in the art, particularly in light of the foregoing teachings. Each of the features of the examples may be utilized alone or in combination or sub-combination with elements of the other examples and/or with other elements. For example, any of the above described methods or parts thereof may be combined with the other methods or parts thereof described above. The steps shown in the figures may be performed in other than the recited order, and one or more steps shown may be optional. It will also be appreciated and understood that modifications may be made without departing from the true spirit and scope of the present disclosure.

The invention claimed is:

1. A method comprising:
    determining, by a computing device, an expected total quantity of dependent frames of a first group of pictures in a video signal, wherein the video signal corresponds with an audio signal;
    based on determining that a total quantity of dependent frames of the first group of pictures in the video signal is less than the expected total quantity of dependent frames, selecting an anchor frame of a second group of pictures subsequent to the first group of pictures, wherein the anchor frame is associated with a scene change;

determining, based on the audio signal deviating from an audio level, an audio time; and causing, based on the selected anchor frame that is associated with the scene change and based on the audio time, the video signal to be synchronized with the audio signal.

2. The method of claim 1, wherein the causing the video signal to be synchronized with the audio signal comprises delaying, by a time duration based on the audio time and a video time associated with the anchor frame, one of the video signal or the audio signal relative to the other of the video signal or the audio signal.

3. The method of claim 1, wherein the determining the expected total quantity of dependent frames is based on receiving supplemental enhancement information indicating the expected total quantity of dependent frames.

4. The method of claim 1, further comprising:

determining, based on a type of content associated with the audio signal and the video signal, an allowable average drift value, wherein the causing the video signal to be synchronized with the audio signal comprises synchronizing the video signal with the audio signal based on an average drift value being greater than the allowable average drift value.

5. The method of claim 1, wherein the selecting the anchor frame comprises determining that the anchor frame is an instantaneous decode refresh frame.

6. The method of claim 1, wherein determining the expected total quantity of dependent frames is based on a scheduled total quantity of predictive or bi-predictive frames associated with groups of pictures in the video signal.

7. An apparatus comprising:

one or more processors; and memory storing instructions that, when executed by the one or more processors, cause the apparatus to:

determine an expected total quantity of dependent frames of a first group of pictures in a video signal, wherein the video signal corresponds with an audio signal;

based on determining that a total quantity of dependent frames of the first group of pictures in the video signal has is less than the expected total quantity of dependent frames, select an anchor frame of a second group of pictures subsequent to the first group of pictures, wherein the anchor frame is associated with a scene change;

determine, based on the audio signal deviating from an audio level, an audio time; and cause, based on the selected anchor frame that is associated with the scene change and based on the audio time, the video signal to be synchronized with the audio signal.

8. The apparatus of claim 7, wherein the instructions, when executed by the one or more processors, cause the apparatus to cause the video signal to be synchronized with the audio signal by delaying, by a time duration based on the audio time and a video time associated with the anchor frame, one of the video signal or the audio signal relative to the other of the video signal or the audio signal.

9. The apparatus of claim 7, wherein the instructions, when executed by the one or more processors, cause the apparatus to determine the expected total quantity of dependent frames by receiving supplemental enhancement information indicating the expected total quantity of dependent frames between anchor frames in the video signal.

10. The apparatus of claim 7, wherein the instructions, when executed by the one or more processors, cause the apparatus to:

determine, based on a type of content associated with the audio signal and the video signal, an allowable average drift value; and cause the video signal to be synchronized with the audio signal by synchronizing the video signal with the audio signal based on an average drift value being greater than the allowable average drift value.

11. The apparatus of claim 7, wherein the instructions, when executed by the one or more processors, cause the apparatus to further select the anchor frame by determining that the anchor frame is an instantaneous decode refresh frame.

12. The apparatus of claim 7, wherein the expected total quantity of dependent frames is based on a scheduled total quantity of predictive or bi-predictive frames associated with groups of pictures in the video signal.

13. A non-transitory computer readable storage medium storing instructions that, when executed, cause:

determining an expected total quantity of dependent frames associated with a first group of pictures in a video signal, wherein the video signal corresponds with an audio signal;

based on determining that a total quantity of dependent frames of the first group of pictures in the video signal is less than the expected total quantity of dependent frames, selecting an anchor frame of a second group of pictures subsequent to the first group of pictures, wherein the anchor frame is associated with a scene change;

determining, based on the audio signal deviating from an audio level, an audio time; and causing, based on the selected anchor frame that is associated with the scene change and based on the audio time, the video signal to be synchronized with the audio signal.

14. The non-transitory computer readable storage medium of claim 13, wherein the instructions, when executed, cause the video signal to be synchronized with the audio signal by delaying, by a time duration based on the audio time and a video time associated with the anchor frame, one of the video signal or the audio signal relative to the other of the video signal or the audio signal.

15. The non-transitory computer readable storage medium of claim 13, wherein the instructions, when executed, cause determining the expected total quantity of dependent frames by receiving supplemental enhancement information indicating the expected total quantity of dependent frames.

16. The non-transitory computer readable storage medium of claim 13, wherein the instructions, when executed, cause:

determining, based on a type of content associated with the audio signal and the video signal, an allowable average drift value; and causing the video signal to be synchronized with the audio signal based on an average drift value being greater than the allowable average drift value.

17. The non-transitory computer readable storage medium of claim 13, wherein the selecting the anchor frame comprises determining that the anchor frame is an instantaneous decode refresh frame.

18. The non-transitory computer readable storage medium of claim 13, wherein the expected total quantity of dependent frames is based on a scheduled total quantity of predictive or bi-predictive frames associated with groups of pictures in the video signal.

19. The method of claim 1, further comprising verifying synchronization of the video signal with the audio signal by comparing a time of silence in the audio signal with a time of a start of a group of pictures in the video signal.

20. The method of claim 1, wherein the audio signal deviating from the audio level corresponds to a portion of the audio signal having an audio level below a lower threshold level or above an upper threshold level.

21. The method of claim 1, wherein the determining the audio time comprises determining a time associated with a variation, in audio levels in the audio signal, that is more temporally proximate to a video time, associated with the anchor frame, than another variation.

22. The method of claim 1, wherein the causing is further based on a drift value corresponding to a difference between a video time, associated with the anchor frame, and the audio time.

23. The method of claim 1, wherein the determining the audio time comprises determining that the audio signal deviates from the audio level by a threshold that is based on a type of content of the video signal and the audio signal.

24. The method of claim 1, wherein the determining the expected total quantity of dependent frames comprises determining a predetermined order of dependent frames in groups of pictures of the video signal.

25. The method of claim 1, wherein the determining the expected total quantity of dependent frames is based on an expected frame spacing between consecutive predictive frames in groups of pictures of the video signal.

26. The method of claim 1, wherein the determining the total expected quantity of dependent frames of the first group of pictures comprises:

determining, for a plurality of groups of pictures corresponding to a same scene of the video signal, a total quantity of dependent frames in each of a plurality of groups of pictures in the video signal, wherein the selecting the anchor frame of the second group of pictures is based on determining, based on the total quantity of dependent frames of the first group of pictures in the video signal being less than the expected total quantity of dependent frames, that the anchor frame is associated with a different scene of the video signal.

27. The method of claim 1, wherein the selecting the anchor frame is based on determining, based on the determining that the total quantity of dependent frames of the first group of pictures in the video signal is less than the expected total quantity of dependent frames, that the anchor frame of the second group of pictures subsequent to the first group of pictures is associated with the scene change.

28. The method of claim 1, further comprising receiving metadata, for the video signal, indicating the total quantity of dependent frames of the first group of pictures, wherein the determining the expected total quantity of dependent frames of the first group of pictures is based on the metadata.

29. The method of claim 1, wherein the selecting the anchor frame comprises determining that the anchor frame is an intra-prediction frame.

* * * * *